Nov. 21, 1967 R. J. A. SIMON 3,353,270
MACHINE FOR THE CONTINUOUS PRODUCTION OF SALT BUTTER
Filed March 30, 1964
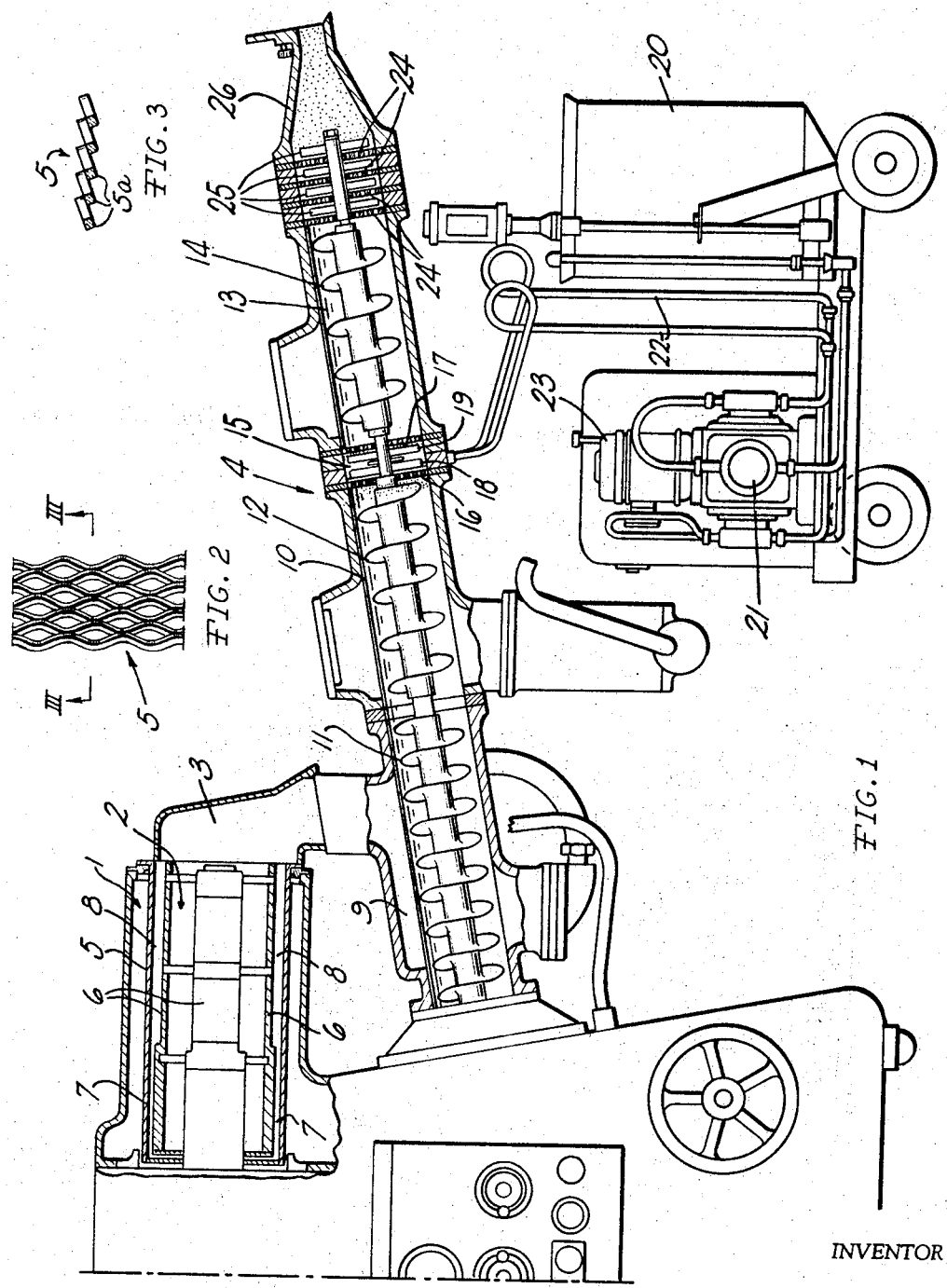
INVENTOR
ROGER JULES ALBERT SIMON
ATTORNEY

3,353,270
MACHINE FOR THE CONTINUOUS PRODUCTION OF SALT BUTTER
Roger Jules Albert Simon, Cherbourg, Manche, France, assignor to Societe anonyme: Etablissements Simon Freres, Manche, France
Filed Mar. 30, 1964, Ser. No. 355,601
Claims priority, application France Feb. 1, 1964, 962,380, Patent 1,392,586
8 Claims. (Cl. 31—33)

ABSTRACT OF THE DISCLOSURE

A machine for the continuous production of salt butter having a screw conveyor type mixing and churning chamber with roughened walls and thin spaced revolving strips at selected stations spaced from the outlet constituting a braking area and means injecting brine in the braking area.

---

When continuously producing salted butter, the mass of material under treatment is successively transferred by the machine to the several devices which perform the necessary operations without any intermediate accumulation taking place. After cream has been churned to form the grain of butter, the resultant butter is transferred to a mixer in which it is worked up, the addition of salt being effected during the mixing operation. Such continuously operating machines work fairly satisfactorily but involve important technical problems. Thus the time during which butter is subjected to the action of the mixers is very short (approximately one minute as against twenty to forty minutes when operating with the usual churns) so that the salt grains have not enough time to absorb a sufficient quantity of water to be readily soluble and to become thoroughly distributed in the mass of butter before the churning operation comes to an end. When dry salt is used, as is customarily done in normal churns for salting butter in continuously operating machines, it is a frequent occurrence that after having been preserved for a few days the salted butter shows out water droplets and sometimes yellow points or mottled portions. This means that the butter becomes second or third class stock for consumption in those countries where salted butter capable of being stowed for a long time just like non-salted butter has to be supplied.

The use of a diluted brine has not been practical hitherto with continuously operating machines because the latter produce butters containing a relatively high percentage of moistness so that the addition of a dilute brine (representing about 25% of salt to 75% of water) would mean producing butters having a higher water content that permitted by the various laws in force.

Devices have been proposed to stave off such difficulties at least partly. These devices were based on the use of a highly concentrated brine which was maintained homogeneous by being subjected to a violent agitation. The mixture thus prepared and then injected into the butter contained a high percentage of salt as against a small proportion of water whereby it became possible to produce butters containing the required percentage of salt without any undue quantity of water.

However these manufacturing methods presented the two following shortcomings, namely First of all, they necessitated the use of extremely fine salt which is hard and expensive to obtain in the trade. Secondly the highly concentrated brine formed a so-called "salt mash" which when it was injected into the mass of butter did not readily distribute itself through it so that the resultant salted butters still presented technical defects such as free water oozing out, mottlings, etc.

It is an object of the present invention to provide a method and a machine or plant permitting in the art of the continuous production of salted butters the use of a brine in which salt is diluted and moderately concentrated.

Another object of the invention is to provide a method as aforesaid based on the reduction of the moisture content in salted butters obtained by means of a continuously operating machine prior to the injection of the brine and based also on a lengthening of the mixing time so that more time elapses between the instant when the brine is injected and the instant when final mixing is completed.

Yet another object of the invention is to provide a method as aforesaid for continuously producing salted butter wherein the churning operation is performed under such conditions as may involve a reduction of the moisture content of the resultant butter, whereafter the mass of butter being mixed is subjected to a checking or braking action in a zone remote from the mixer outlet and then brine is injected into the butter-braking zone, and mixing is continued between said zone and the mixer outlet.

A further object of the invention is to provide a method as aforesaid wherein, in order to reduce the moisture content, operating conditions are used that bring about a high impact intensity on the fatty globules of the cream so as suddenly to break them down, thereby fostering the liberation of the fatty matter and consequently their agglomeration into butter grains.

Extensive research work which led to the present invention has revealed that in a continuously operating churn utilizing the known churning method involving the use of a beater rotating at a high speed inside a cylinder, the required operating conditions are obtained by providing fairly large bosses or asperities on at least a portion of the inner surface of the cylinder whereby the fatty globules entrained into the ring of matter that forms itself in the cylinder is broken up by hitting said bosses or asperities.

An injection of brine into that operating zone which brakes or slows down the progression of butter which is spaced from the outlet of the mixer as above described permits the brine to stay for a fairly long time in the butter before its incorporation during final mixing. Owing to the contact which is thus provided, the temperatures of butter and brine become harmonized, thereby facilitating subsequent atomization of the brine throughout the mass of butter. Moreover the small salt grains which may still exist in a highly concentrated brine have enough time to absorb a sufficient quantity of water to become thoroughly diluted during the final mixing.

A still further object of the invention is to provide a new or improved machine for carrying out the aforesaid method, said machine comprising means in the churning device for causing the formation of the butter grain under conditions ensuring a reduction of the percentage of moistness, means in the mixer for creating a butter-braking zone off the outlet of the mixer, and means for introducing brine into said braking zone.

In a suitable constructional form of the machine, the cylindrical wall of the churning device is provided with well marked bosses or asperities. For constituting such asperities, there may be provided for example a liner (for example a removable liner) which in a suitable form may be made of expanded metal and is engaged inside the churning cylinder.

According to another feature, the churning device is fitted with a rotary beater provided with thin strips or blades arranged opposite roughened walls and at a small distance from them. The gap between these strips and said walls may be gradually increasing, for example stepwise so as to match the growth of the butter grain being formed.

According to a further feature, there is provided in the mixer of the continuous butter-producing machine comprising one or two mixing units in which screws are revolubly supported, at least a set of perforated plates associated with fins, preferably having several wings. A possibility is afforded according to the invention to provide after the first two elements of the mixer a chamber defined by a pair of perforated plates between which revoluble fins can rotate and into which the brine is injected, a mixing chamber containing a worm of known type and constructed so as to prevent any leakage of brine being provided near the salting chamber so as to ensure an additional mixing time ere to the arrival of the butter adjacent those sequential sealing partitions which perform its final homogenization.

Yet a further object of the invention is to provide a machine for injecting brine into the salting chamber including a vat or tank fitted with an agitator for preparing and preserving homogeneousness of the brine and a measuring pump forming a unitary assembly made up of a prime mover and a speed variator permitting the precise quantity of supplied brine to be accurately adjusted in accordance with the required degree of salting of the butter and with the output of the machine for continuously producing the same.

While throughout the present specification, a churning cylinder having a roughened wall is described as applied to the production of salted butter, it should be understood that such a cylinder which permits the percentage of moisture in the butter to be lessened may be also used when manufacturing non-salted butter.

With these and such other objects in view as will incidentally appear hereafter, the invention comprises the novel steps and combination of steps, so far as the method is concerned, also the novel parts and combination of parts, so far as the machine is concerned, as will be described hereafter with reference to the accompanying diagrammatic drawing exemplifying the same and forming a part of the present disclosure.

In the drawing:

FIGURE 1 is a perspective view mostly in section of a machine for the continuous production of butter provided with the improved devices for reducing the percentage of moisture and for salting the butter.

FIGURE 2 is a fragmentary plan view of the removable liner engaged into the churning cylinder.

FIGURE 3 is a sectional view on the line III—III of FIG. 2 showing on an enlarged scale a constructional detail.

The machine for the continuous production of butter as shown in the accompanying drawing comprises as is known in the art a churning cylinder 1 in which a fast rotating beater 2 is supported, said cylinder 1 communicating through a chute 3 with the inclined mixer generally designated by 4.

In order to increase the efficiency of the churning action and substantially to reduce the percentage of moisture of butters made in such a machine, there is provided according to the invention inside the churning cylinder 1 a removable liner 5 made of stainless expanded or opened up metal or alloy having bosses or asperities 5a (see FIG. 3). This liner may be made, depending upon those creams which are to be worked up into butter, either entirely of expanded metal or partly of expanded metal in the first portion of the churning cylinder 1 and then partly of smooth metal sheet. The fatty globules entrained by the stock ring which forms itself in the churning cylinder 1 are broken up when hitting the asperities 5a.

In order to perform a satisfactory churning action, the beater 2 is fitted with thin strips or blades 6 arranged in front of the asperities 5a of the removable liner 5. These strips 6 are arranged stepwise so as to provide with respect to the churning cylinder 1 or other removable liner 5 in the first part of the machine where formation of the butter grain takes place a space 7 of smaller volume than the space 8 formed in the second part of the churning cylinder 1 or liner 5 where the butter grain grows up. As the butter being formed comes down the chute 3, it reaches the first element 9 and then the second element 10 of the mixer 4 which are provided in the known fashion with Archimedean screws or worms 11, 12 which drive along the butter and direct it towards the mixing chamber 13 which is also provided with an Archimedean screw 14.

Between the mixer 4 and the chamber 13 is defined a chamber 15 comprising a pair of perforated plates 16, 17 encompassing between them a pair of revoluble fins 18, 19. The chamber 15 constitutes the butter-salting space in which brine is to be injected.

The device for injecting brine comprises a vat or tank 20 provided with an agitator which efficaciously prepares and preserves proper homogeneousness of the brine, and a measuring pump 21 connected with the chamber 15 through pipes 22 and including a unitary unit or block comprising a prime mover such as an engine 23 and a speed variator whereby the exact quantity of brine which is injected can be accurately determined in ratio of the degree of salting of the butter which it is desired to achieve, also in terms of the output of the machine.

The chamber 13 which contains an Archimedean screw or worm 14 ensuring an additional mixing time is provided with a set of perforated plates 24 encompassing between them revoluble fins 25 constituting sequentially acting sealing partitions preventing any leakage of brine and performing final homogenization of the butter before it comes out through the upper outlet nozzle 26.

It will be understood that owing to the aforesaid construction, the brine remains for some time in the butter between the instant when it is injected and the instant when it is completely incorporated with the butter due to the action of the final mixing contrivance formed by the chamber 13.

Minor constructional details may be varied in the ambit of the invention without departing from the scope of the subjoined claims.

What is claimed is:

1. In a machine for the continuous production of salt butter comprising cream-feeding means, a churning device, a mixer, means for transferring the butter mass due to the churning action in said mixer, conveyor screws in the mixer, and an outlet to which the mixed butter is fed by said screws; roughened walls having sharp asperities inside the churning device, thin strips arranged inside said device opposite to said walls and at a small distance therefrom for producing the churning action owing to a centrifugal effect between said strips and said roughened walls under such conditions as to achieve a reduction of the moisture content of the resultant butter, means for rapidly revolving said thin strips, means in the mixer for generating a butter-braking region spaced from said outlet, and means for introducing brine into said braking region of the mixer.

2. In a machine for the continuous production of salt butter comprising cream-feeding means, a churning device, a mixer, means for transferring the butter mass due to the churning action in said mixer, conveyor screws in the mixer and an outlet to which the mixed butter is fed by said screws; roughened walls inside the churning device, said walls being constituted by an additional metal liner having sharply protruding asperities, thin strips arranged inside said device opposite to said walls and at a small distance therefrom for producing the churning action owing to a centrifugal effect between said strips and said roughened walls under such conditions as to achieve a reduction of the moisture content of the resultant butter, means for rapidly revolving said thin strips, means in the mixer for generating a butter-checking region spaced from said outlet, and means for introducing brine into said checking region of the mixer.

3. In a machine for the continuous production of salt butter comprising cream-feeding means, a churning device, a mixer, means for transferring the butter mass due to the churning action in said mixer, conveyor screws in the mixer and an outlet to which the mixed butter is fed by said screws; roughened walls inside the churning device, said walls being constituted by an additional liner made of expanded metal and having sharply protruding asperities, thin strips arranged inside said device opposite to said walls and at a small distance therefrom for producing the churning action owing to a centrifugal effect between said strips and said roughened walls under such conditions as to achieve a reduction of the moisture content of the resultant butter, means for rapidly revolving said thin strips, means in the mixer for generating a butter-checking or butter-braking region spaced from said outlet, and means for introducing brine into said butter-checking region of the mixer.

4. In a machine for the continuous production of salt butter comprising cream-feeding means, a churning device, a mixer, means for transferring the butter mass due to the churning action in said mixer, conveyor screws in the mixer, and an outlet to which the mixed butter is fed by said screws; roughened walls inside the churning device, said walls being constituted by an additional liner having sharply protruding asperities, thin strips arranged inside said device opposite to said walls and at a small distance therefrom for producing the churning action owing to a centrifugal effect between said strips and said roughened walls under such conditions as to achieve a reduction of the moisture content of the resultant butter, the gap between said strips and said liner gradually increasing as the mass being churned progresses so as to foster the growth of the butter grain, mean for rapidly revolving said thin strips, means in the mixer for generating a checking zone forming a butter-braking region spaced from said outlet, and means for introducing brine into said butter-checking region of the mixer.

5. In a machine for the continuous production of salt butter comprising cream-feeding means, a churning device, a mixer, means for transferring the butter mass due to the churning action in said mixer, conveyor screws in the mixer, and an outlet to which the mixed butter mass is fed by said screws; roughened walls inside the churning device, said walls being constituted by an additional liner having sharply protruding asperities, thin strips arranged inside said device opposite to said walls and at a small distance therefrom for producing the churning action owing to a centrifugal effect between said strips and said roughened walls under such conditions as to achieve a reduction of the moisture content of the resultant butter, means for rapidly revolving said thin strips, means in the mixer for creating a butter-braking action checking butter flow and spaced from said outlet, pipe means for introducing brine into said butter-braking region of the mixer, said braking region being constituted by a pair of perforated plates encompassing fins adapted to revolve therebetween, said means for introducing the brine ending between said perforated plates.

6. In a machine for the continuous production of salt butter comprising cream-feeding means, a churning device, a mixer, means for transferring the butter mass due to the churning action in said mixer, conveyor screws in the mixer and outlet to which the mixed butter is fed by said screws; roughened walls inside the churning device, said walls being constituted by an inset liner having sharply protruding asperities, thin strips arranged inside said churning device opposite to said walls and at a small distance therefrom for producing the churning action owing to a centrifugal effect between said strips and said walls for achieving a reduction of the moisture content of the resultant butter, means for rapidly revolving said strips, means in the mixer for creating a checking zone forming a butter-braking region and spaced from said outlet, pipe means for introducing brine into said butter-braking region of the mixer, and a mixer chamber defined downstream with respect to said braking region and associated with an agitating zone creating a whirling action under sealed conditions.

7. In a machine for the continuous production of salt butter comprising cream-feeding means, a churning device, a mixer, means for transferring the butter mass due to the churning action in said mixer, conveyor screws in the mixer and an outlet to which the mixed butter is fed by said screws; roughened walls having asperities, thin strips arranged inside said churning device opposite to said walls and at a small distance therefrom for ensuring the churning action owing to a centrifugal effect between said strips and said roughened walls so as to achieve a reduction of the moisture content of the resultant butter, means for rapidly revolving said strips, means in the mixer for creating a flow-checking zone forming a butter-braking space and remote from said outlet, pipe means for introducing brine into said butter-braking space, and means for creating a whirling agitation on the butter, said last-cited means including perforated plates and fins arranged in alternation.

8. In a machine for the continuous production of salt butter comprising cream-feeding means, a churning device, a mixer, means for transferring the butter mass due to the churning action in said mixer, conveyor screws in the mixer and an outlet to which the mixed butter is fed by said screws; roughened walls having asperities, thin strips arranged inside said churning device opposite to said walls and at a small distance therefrom for ensuring the churning action owing to a centrifugal effect between said strips and said roughened walls so as to reduce the moisture content of the resultant butter, means for rapidly revolving said strips, means in the mixer for creating a flow-checking zone forming a butter-braking space and remote from said outlet, pipe means for introducing brine into said butter-braking space, and adjusting means associated with the pipe means for introducing the brine.

References Cited
UNITED STATES PATENTS

| | | | |
|---|---|---|---|
| 1,540,761 | 6/1925 | Chormann | 259—84 |
| 2,039,162 | 4/1936 | Gerstenberg | 31—35 |
| 2,571,573 | 10/1951 | Henrard | 31—89 |
| 2,649,377 | 8/1953 | Wilsmann | 99—119 |
| 2,791,834 | 5/1967 | Nanz | 31—35 |
| 2,965,362 | 12/1960 | Flottmann | 259—8 |
| 3,134,170 | 5/1964 | Wilsmann | 31—33 |

ALDRICH F. MEDBERY, *Primary Examiner.*